United States Patent [19]

Peck et al.

[11] 4,231,529
[45] Nov. 4, 1980

[54] IMPACT DECORTICATOR

[75] Inventors: Norman J. Peck, Seven Hills; Thomas J. Rowland, Whalan; John R. Ashes, Baulkham Hills, all of Australia

[73] Assignee: Commonwealth Scientific and Industrial Research Organization, Campbell, Australia

[21] Appl. No.: 923,688

[22] Filed: Jul. 11, 1978

[51] Int. Cl.³ ............................................ B02C 13/282
[52] U.S. Cl. ............................ 241/189 R; 241/285 R
[58] Field of Search ................ 241/189 R, 189 A, 73, 241/260, 242, 285 R

[56] References Cited
U.S. PATENT DOCUMENTS

| 1,420,354 | 6/1922 | Williams | 241/189 R |
| 3,497,145 | 2/1970 | Sackett, Sr. | 241/189 R X |

Primary Examiner—Mark Rosenbaum
Attorney, Agent, or Firm—Cushman, Darby & Cushman

[57] ABSTRACT

An impact decorticator is disclosed having a rotor, preferably a squirrel-cage rotor, mounted for rotation about a substantially horizontal axis in a generally concentric and cylindrical casing. The casing is provided at the upper portion with an inlet opening and in the lower portion with an outlet opening for the material being processed and graded, substantially horizontally extending ripples are formed on the internal surface of the casing between the inlet and outlet openings (in the direction of rotor rotation), the ripples being graded in that they are spaced progressively closer together, become progressively sharper, become progressively deeper and/or approach more closely from the inlet toward a central zone between the inlet and outlet openings.

19 Claims, 3 Drawing Figures

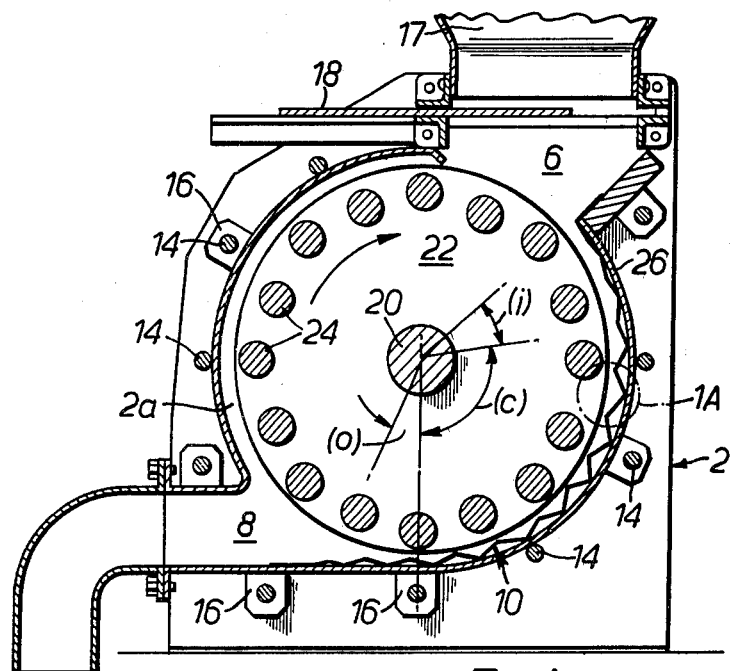
FIG. 1.
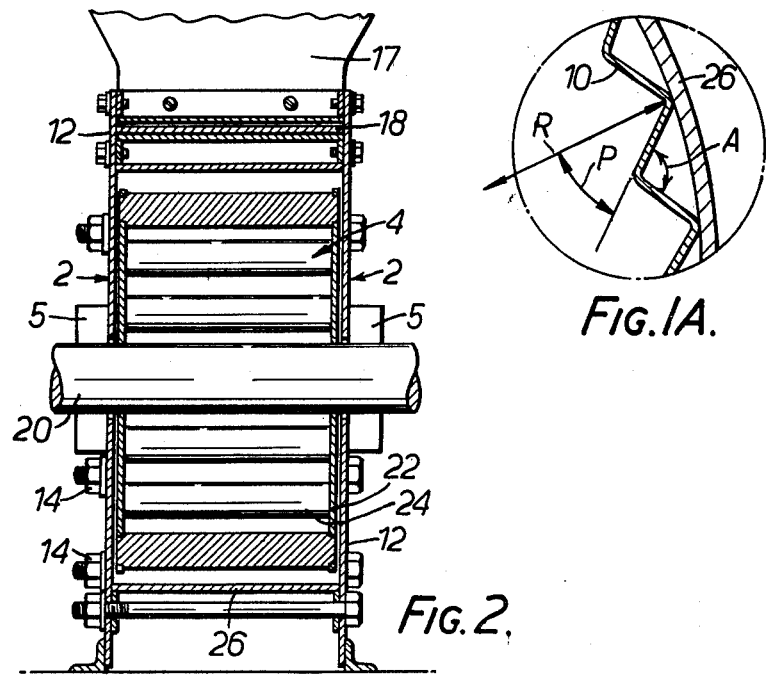
FIG. 2.
FIG. 1A.

IMPACT DECORTICATOR

This invention is concerned with apparatus for comminuting, separating or de-husking plant materials such as leaves, straw and seeds by propelling the material at high velocity against itself, or against other objects by means of a rotor or like device. For the purpose of the present specification, the term 'impact decorticator' will be used generically to designate apparatus of this type. The invention thus seeks to provide impact decorticators capable of substantially improved operating efficiency.

The rotors of known impact decorticators are typically mounted to rotate about a horizontal axis in a fixed casing provided with an inlet above the rotor and an outlet below. In such decorticators, the rotors are provided with radially extending blades or vanes to propel the material to be comminuted, and a casing is provided with ribs or projections on its internal surface against which the material is thrown. For example, U.S. Pat. No. 2,217,568 discloses a mill suitable for grinding beans etc., which employs a rotor having radial vanes like that used in hammer mills and an internally ribbed casing.

The use of such impact decorticators in commercial practice for the processing of seeds and other plant material is nevertheless unusual. This seems to be because they have hitherto offered little advantage over hammer or grinder mills in that, in order to reliably obtain a satisfactory product in a single pass, it has been thought necessary to ensure that the blades and co-acting casing projections exert a shearing or grinding action. But the principal function of a decorticator is to crack, open-up or remove the fibrous husk, stem or cortex of the plant material from the kernel, pith or leafy material, in such a way that the two components can be readily separated by using aspirated screens or the like. Excessive grinding is not only wasteful of energy but it also makes subsequent separation of the cortex and kernel components more difficult and less efficient.

It is therefore an object of this invention to provide an impact decorticator which will enable the efficient processing of a wide variety of seeds and plant materials. The invention is based upon the discovery that the use of graded ripples on the internal surface of the casing between the inlet and outlet in the direction of rotor rotation, allows highly efficient processing—particularly if a squirrel cage rotor is employed. Preferably, the ripples extend horizontally or longitudinally along the casing and are graded in that they are spaced progressively closer together, become progressively steeper and/or progressively increase in depth as they progress from the inlet toward at least the central zone between inlet and outlet. It is also preferable that the apexes of the ripples should be spaced more closely to the rotor as they progress from the inlet, but they should not approach so close as to cause substantial shearing or crushing of the plant material; that is, the minimum distance between the rotor and the ripples should preferably be greater than the mean cross-section of the seeds (or other plant material) being processed.

Preferably—but not essentially—the ripples are graded in all these ways; i.e. they become shallower, flatter and wider toward the inlet, and in addition, have their peaks spaced further away from the rotor as they progress towards the inlet. It is also preferable in accordance with this invention to grade the ripples in a similar but inverse manner as they progress towards the outlet. However, there should be a substantial central zone in which the ripples are uniform.

The squirrel cage rotor should, preferably, be hollow and open, having evenly spaced and longitudinally extending bars around its periphery, which bars should preferably be hollow and have a generally circular cross-section. It is also preferable to stagger the bars so that, for example, alternate bars lie upon a pitch circle which has a smaller radius than that upon which the remainder of the bars are located, the difference in the radii being preferably not greater than the radial dimension of the bars themselves. Preferably, the angular pitch of the bars is somewhat greater than that of the ripples; that is, the ratio of the angular pitch of the ripple to that of the bars should lie within the range of approximately 1.0 to 3.5.

For optimum operation with a wide range of oil seeds, it has been found preferable to locate most ripples in the central zone where the ripples are uniform in depth, spacing and angle and, indeed, are the steepest and deepest ripples employed. More particularly, it has been found advantageous to employ graded ripples in the inlet zone over not less than 25° (preferably 30°–40°) of angle of rotation about the rotor axis, and to employ the deep and uniform ripples over not less than 90° (preferably 100°–120°) in the central zone. Graded ripples in the outlet zone have some value, but may be reduced to a few or even omitted altogether.

Although not essential, it is also preferable to form the ripples with substantially flat faces; that is, with a substantially triangular cross-section. It is not essential, however, to make the ripples symmetrical in shape. Saw-tooth section ripples may be advantageous if the leading surface is larger than the following because they then offer a greater surface area to impacting material. However, care should be taken to avoid making the included angles of the troughs so acute that material can wedge or lodge in the troughs; in general, such angles should not be less than 90°. Ripple depth will, of course, also have a bearing on this. For the processing of most varieties of seeds and grains, the leading faces of the substantially uniform ripples in the central zone should preferably have angles of presentation between 50° and 70°. A maximum ripple depth in the range 5 mm to 20 mm has been found to offer a satisfactory blend of efficiency and throughput for ripples in this zone. By contrast, the first few ripples in the inlet zone may have angles of presentation approaching 80°–85° and a depth of 3 mm or less.

In accordance with another preferred feature of this invention, the ripples are simply and effectively formed by bending up an arcuate ripple plate for use as the internal surface of the casing. In that event, it may be desirable for the ripple plate to rest against the wall of the casing itself. Such plates have the important advantage of yielding when foreign materials such as stones or nails are accidentally put through the decorticator. Nevertheless, the use of ripples cast integrally with the casing wall—possibly in three separate zone sections—will be preferred for heavy duty machines.

To ensure decortication of resilient oil seeds as well as the fracture of dry seed and fibrous material, the peripheral speed of the squirrel cage rotor should be at least 3500 cm/sec. It is desirable, however, that the decorticator be equipped with a variable speed drive so that speeds of up to 10,000 cm/sec. can be employed for fine milling. Another preferred feature which imparts considerable flexibility to the machine is the provision for moving the squirrel cage rotor, on its bearings, toward or away from the ripple plate to provide a spacing of between 3 and 20 mm between the rotor bars and the apex of the ripples in the central zone of the plate. Thus, a clearance of about 10 mm has been found suitable for de-hulling sunflower, while 7 mm was suited to de-hulling rape seed. On the other hand, sunflower was effectively milled by reducing the clearance to about 5 mm and employing a higher rotor speed.

The use of open, staggered-bar squirrel cage rotors in conjuction with graded ripples confers surprising operating economies over more conventional hammer mills, and over so-called cage mills in which material is fed into the centre of a rotating squirrel cage. This arises, first, because of the substantially reduced power consumption due to the absence of significant grinding through a direct shearing or crushing action, and because of the extremely simple and rugged design. The effectiveness of the impact decorticator is thought to be due to the fact that uncomminuted material is constantly returned for impacting by the combined action of the graded ripples and the recessed rotor bars. The fact that the wear on the ripples and bars is relatively even provides evidence for this; if grinding were occurring, the points or peaks of the ripples would be worn preferentially. Moreover, the performance of the decorticator does not vary significantly with bar or ripple wear, quite unlike hammer mills. Accordingly, a decorticator of this type and examples of its operation will now be described by way of illustration.

In the following description, reference will be made to the accompanying drawings, in which:

FIG. 1 is a transverse cross-section of an impact decorticator having many of the preferred features indicated above;

FIG. 1A is an enlarged diagrammatic detail of FIG. 1 showing how angle of presentation is defined; and FIG. 2 is a longitudinal, or axial, section of the decorticator of FIG. 1.

The impact decorticator of the chosen embodiment consists, basically, of a fixed casing 2, a squirrel cage rotor 4 mounted for rotation within the casing, inlet 6 and outlet 8 formed in the top and bottom of casing 2 (respectively), and a sheet metal ripple plate 10 located within the casing so as to extend between inlet 6 and outlet 8. Rotor 4 is mounted in bearings 5 fixed to end plates 12 of the casing for adjustable movement to and from ripple plate 10. As will be seen from the drawings, casing 2 is formed in two semi-cylindrical portions 2a and 2b which are held in place between end plates 12 by tie bolts 14 and lugs 16. It will also be seen that flow of material into the decorticator from a hopper 17 can be controlled by slidable regulator-plate 18.

The squirrel cage rotor 4 of this embodiment simply consists of a central drive shaft 20 bearing two end circular plates or discs 22 between which a number of regularly-spaced striker-bars 24 are mounted around the periphery thereof. In case illustrated, the bars are solid, of circular cross-section and alternate bars are at different radial distances from shaft 20. It will be seen that the difference between the radii of the two pitch circles is less than the diameter of a bar 24. Preferably for large-capacity machines, one or more intermediate discs (like end plates 22) are employed to stop undue distortion of the bars 24 under centrifugal force. Also, it may be preferable on heavy duty machines to cast the ripples integrally with the casing, employ hollow and replaceable striker bars 24 which are held in position by keeper plates or the like secured on the outer face of each end plate 22.

In this embodiment, however, ripple plate 10 is bent up from stainless steel sheet and extends the full axial length of casing wall 2b and the full circumferential distance between inlet passage 6 and outlet passage 8. As evident from FIG. 1, the ripples run longitudinally across the ripple plate, are of symmetrical triangular section and are graded toward the inlet and outlet in angle, depth and frequency (angular pitch). The angle of presentation (p) of a ripple is defined as the angle between the leading face of the ripple and a radial line drawn from the centre of shaft 20 (or casing 2) to the bottom of that face. This is shown clearly in FIG. 1A, from which it will be seen that, for symmetrical and triangular ripples like those illustrated, the angle of presentation (p) is approximately one half of the ripple apex angle (A).

In this embodiment, the graded ripples of the inlet zone extend over an arc which subtends angle (i), the full depth and sharp ripples of the centre zone subtend angle (c), and the graded ripples at the outlet subtend angle (o). In this case, (i) is approximately 35°, (c) is approximately 100° and (o) is approximately 20°. Also in this embodiment, the inlet zone ripples start with a depth of 3 mm and an angle of presentation of 75°, increasing gradually to the 12 mm depth of the central zone ripples which have an angle of 55°, while the last outlet ripple might have a depth of no more than 2 mm and an angle of about 80°.

The following specific examples will serve to demonstrate the surprising advantages conferred by impact decorticators having graded ripple plates and staggered-bar squirrel cage rotors described above. In these examples (unless otherwise stated), the squirrel cage rotor had 32 evenly spaced 18 mm diameter rods, 300 mm long secured between end discs, 16 bars at 376 mm pitch circle diameter and 16 intermediate bars at 356 p.c.d. The arcuate length of the ripple plate from inlet to outlet was 515 mm.

EXAMPLE 1

To illustrate the improvement in dehulling performance offered by a graded ripple plate, sunflower seeds were run through the decorticator equipped with a ripple plate where the angle of presentation of ripples in all zones was a uniform 57° and the ripple depth was a uniform 12 mm. Then seeds from the same source were run through the decorticator with a graded ripple formed as described in the particular example given above. A rotor speed of 4400 cm/sec and a rotor-to-plate spacing of 11 mm (measured in the central zone) was employed in each case.

The current drawn by the motor was measured, allowing calculation of power consumption for processing a given quantity of seed. The mean results from processing six 500 kg lots of seed with each plate, showed that when using the uniform ripple plate 15% more power was required than with the graded ripple plate to produce a product of suitable quality for pelleting for animal feeds (i.e. no more than 10% whole seed in product). Indeed, use of the uniform ripple plate produced 32% more material which was excessively finely ground for kernel separation purposes.

EXAMPLE 2

To show the effect of a staggered bar rotor, a 1000 kg batch of sorghum was milled with the graded ripple plate decorticator of Example 1, while the power input to the motor was monitored and the roter speed was maintained at 7100 cm/sec. This yielded a figure of 1200 watts/hr/tonne for a satisfactory product. The rotor was then replaced with a similar one in which all 32 bars were located at the larger p.c.d. (376 mm), and the trial was repeated, maintaining the same speed. This yielded a figure of 1410 watts/hr/tonne and provided a satisfactory product which sieved slighly more coarse than the first.

This is a surprising result as it might be expected that the recessed bars would do less work and that the grind of the staggered rotor would therefore be more coarse; but it emphasises that low-energy impact-fracture is occurring rather than high-energy grinding. It is found, however, that if the recessed bars are omitted or if they are recessed much more deeply, severely impaired comminution results.

EXAMPLE 3

To further illustrate the advantageous effect of a graded ripple-plate in combination with a staggered-bar squirrel cage rotor, successive lots of sorghum seed were milled at a rotor speed of 7100 cm/sec. and a plate/rotor gap of 8 mm. For the first lot (i), the decorticator was fitted with a ripple plate having the uniform ripples described in Example 1. For the second lot (ii), the ripples in the inlet zone were graded as described in the particular embodiment. For the third lot (iii), a ripple plate similar to (ii) was used, except that the graded inlet zone covered 70° rather than 35°. The result, expressed in Table 1, again showed a significantly greater power consumption when the plate did not have a graded lead-in. While the power consumption in the second and third lots was substantially the same, but product of the third lot was too coarse for pelleting purposes.

TABLE 1

| Plate | Power Consumption watts/tonne/hr. | % product through B.S.S. 410 Screens | | | |
|---|---|---|---|---|---|
| | | 8 | 12 | 16 | 28 |
| (i) | 1400 | 96.9 | 86.8 | 65.7 | 26.3 |
| (ii) | 1200 | 97.6 | 82.9 | 54.1 | 28.0 |
| (iii) | 1200 | 94 | 66.8 | 38.3 | 14.8 |

EXAMPLE 4

This Example provides a comparison between the performance of the graded ripple-plate impact decorticator and a conventional hammer mill. The rotor-to-plate clearance of the decorticator of Example 1 was reduced to 8 mm to produce a grinding effect equivalent to processing sorghum with a hammer mill and 3 mm screen. The rotor was again run at 7100 cm/sec. With the graded ripple plate, the power consumption was 1700 watts/tonne/hr. when processing sorghum of 15% moisture content. Whereas with sorghum of 25% moisture content, power consumption was 1900 watts/tonne/hr. Even the latter figure compares most favourably with a conventional hammer mill with a 3 mm screen where twice this power consumption would be normal for processing the 15% moisture content sorghum.

EXAMPLE 5

To demonstrate the effect of ripple angle, a series of ripple plates were constructed having graded ripples in the end portions of the plate arc and uniform ripples in the centre portion. As the ripples were of symmetrical triangular section, their included apex angles in the uniform centre portion can be assumed to be twice their respective presentation angles. These angles were varied from plate to plate, although the depth of the centre-zone ripples was the same in each plate. Each plate was used to process sunflower seed, at a rotor speed of 4400 cm/sec. and with rotor/plate clearance of 11 mm. The screening results are presented in Table 2. From this it will be seen that ripple presentation angles in the range 57°–60° give good dehulling performance, i.e. better than 90% separation at one pass. With greater angles, the product is unsatisfactory in that excessive uncracked grain is likely, while with smaller angles, unnecessary comminution and excessive power consumption takes place, and, there is the likelihood of ripple-clogging.

TABLE 2

| Ripple Apex Angle | Power Consumption Watts/tonne/hr. | Uncracked Seed in Product % | % product through B.S.S. 410 | | |
|---|---|---|---|---|---|
| | | | 8 | 12 | 16 |
| 135 | 560 | 34 | 15 | 8 | 5 |
| 120 | 620 | 6 | 32 | 19 | 13 |
| 115 | 830 | 9 | 32 | 18 | 12 |
| 95 | 900 | 2 | 48 | 29 | 20 |

EXAMPLE 6

Since the nutritionally desirable components of seeds are concentrated in the kernel, and important application of the decorticator is to provide a feed to a simple aspirated screen so that the fibrous husk can be removed and the kernel components concentrated. This improves the nutritional value of the processed material, as well as making the kernels more suitable for subsequent processing, such as oil extraction. A wide range of seeds were fed through the graded-plate impact decorticator of Example 1 to demonstrate its surprising ability to handle various materials. The results are tabulated in Table 3.

TABLE 3

Composition of Seed and Seed Fractions Before and After Comminution and Separation Over an Aspirated Screen

| Seed | Percent Composition* | | | PERIPHERAL ROTOR SPEED |
|---|---|---|---|---|
| | Protein | ADF** | ASH | |
| Cotton (before) | 24.9 | 26.7 | 4.4 | 4000 |
| Kernel (after) | 32.6 | 7.3 | 5.4 | |
| Husk (after) | 3.4 | 65.3 | 2.4 | |
| Lupin (before) | 30.3 | 23.5 | 2.9 | 2700 |
| Kernel (after) | 43.5 | 6.9 | 3.0 | |
| Husk (after) | 3.4 | 67.9 | 2.3 | |
| Rape (before) | 20.2 | 14.4 | 4.0 | 4300 |
| Kernel (after) | 23.4 | 9.2 | 4.0 | |
| Husk (after) | 15.4 | 48.3 | 4.9 | |
| Safflower (before) | 16.9 | 33.4 | 2.4 | 4300 |
| Kernel (after) | 24.6 | 11.8 | 3.2 | |
| Husk (after) | 5.8 | 60.5 | 2.0 | |
| Soya bean (before) | 44.7 | 7.3 | 5.3 | 2700 |
| Kernel (after) | 44.2 | 5.6 | 5.1 | |
| Husk (after) | 11.9 | 51.1 | 4.6 | |
| Sunflower (before) | 19.1 | 16.0 | 2.7 | 3600 |
| Kernel (after) | 23.7 | 4.0 | 3.0 | |

TABLE 3-continued

Composition of Seed and Seed Fractions
Before and After Comminution and Separation
Over an Aspirated Screen

| Seed | Percent Composition* | | | PERIPHERAL ROTOR SPEED |
|---|---|---|---|---|
| | Protein | ADF** | ASH | |
| Husk (after) | 7.0 | 58.8 | 2.5 | |

*Dry matter basis
**Acid detergent fibre

Another important aspect of the present invention is the ability of the squirrel cage rotor and ripple plate combination to orientate elongated particles so as to impact them predominantly along their longitudinal axes thereby splitting the particle lengthwise. This feature is important for at least two potential applications. In hay or similar feedstuffs for ruminant animals, the fibrous outer covering retards digestion but it is nevertheless desirable to have long fibre lengths to stimulate the animal's processes. When such material is processed in a decorticator according to the present invention, the product is split to expose the inner portion to the digestive environment of the animal without the fine comminution of the fibre as occurs in conventional hammer mills.

Fibrous and leafy materials can in fact be fractionated using this invention. For example, when dry lucerne hay containing 16.8% crude protein in the dry matter was milled (in the machinery as described in Example 1) with a peripheral rotor speed of 9,000 cm/sec and screened without aspiration, it yielded two fractions of approximately equal mass. The fraction that passed through the screen was largely leaves; it contained 20.5% crude protein and 22.2% fibre and has obvious potential as as protein leaf concentrate. The remaining fraction was composed of stem material and consequently useful as a lower protein (11.8%), higher fibre (47.2%) roughage for ruminant animals. When material from the same batch of lucerne hay was treated in conventional hammer miller (3 mm screen) or cut by a conventional chaff cutter, no product was obtained which yielded a protein-enriched fraction when screened.

Other important applications of the decorticator are, for example, in the grinding of pulp wood wherein it is desirable to comminute the wood chips while retaining the maximum fibre length; in separating the pith from fibre in sugar-cane bagasse with high efficiency; and in kibbling chicken manure pellets for more even spreading with a broadcast spreader or the like. None of these tasks can be satisfactorily handled by conventional grinding or hammer mills.

Because the grinding and milling art is closely worked, particularly in the animal feeds field, the very substantial improvement in operational efficiency offered by the present invention is most surprising. While the lower energy consumption of a squirrel cage rotor might be expected because of its windage and indirect grinding action, it is surprising to find that seed and the like material is thoroughly and more uniformly decorticated in spite of the open construction of the rotor. This is a result, it is thought, of the setting up of a bounce-pattern of seed motion between the rotor bars and graded ripple plate. In any event, the energy savings for a given throughput of a given raw material are very substantial when compared to other types of comminuting apparatus (e.g. hammer mills) commonly employed in the art.

We claim:

1. An impact decorticator having a rotor mounted for rotation about a substantially horizontal axis in a generally concentric and cylindrical casing having an internal surface and provided at the upper portion thereof with an inlet opening and in the lower portion thereof with an outlet opening for the material being processed, said impact decorticator being characterised in that graded, substantially horizontally extending ripples are formed on the internal surface of the casing between the inlet and outlet (in the direction of rotor rotation), said ripples having generally flat surfaces and being graded in that they become progressively sharper from the vicinity of the inlet opening, toward a central zone between the inlet and outlet openings the surfaces of the ripples which face opposite the direction of rotation having angles of presentation which decrease from about 85° in the vicinity of the inlet opening to a minimum of about 50° in the central zone, the angle of presentation being the angle between a respective flat surface which faces opposite the direction of rotation and a radial line drawn from the axis of rotation of the rotor to the bottom of that surface.

2. An impact decorticator according to claim 1, having an open squirrel-cage rotor with regularly spaced, longitudinally extending bars arranged substantially concentrically around the axis of rotation of the rotor.

3. An impact decorticator according to claim 1 or claim 2, wherein said graded ripples are formed in an inlet zone of said internal surface adjacent to the inlet opening, and wherein a plurality of substantially uniform (i.e. ungraded) ripples are formed in a central zone of said internal surface adjacent to the inlet zone.

4. An impact decorticator according to claim 3, wherein graded ripples are formed in an outlet zone of said internal surface between said central zone and the outlet opening, the graded ripples of the inlet zone increase in sharpness, depth and closeness to the rotor as they progress toward the central zone, the uniform ripples of the central zone are the sharpest, deepest and closest to the rotor of all the ripples, and wherein the graded ripples of said outlet zone decrease progressively in depth and sharpness as they progress toward the outlet from the central zone.

5. An impact decorticator according to claim 4, wherein the arcuate length of the inlet zone and the arcuate length of the central zone are (respectively) between 15 and 30%, and between 20 and 50%, of the total arcuate length of the inlet, central and outlet zones.

6. An impact decorticator according to claim 1, wherein the ripples are formed by bending a sheet metal plate into a rippled arcuate form, said plate is located within the casing so as to extend between the inlet and outlet thereof, and wherein the ripples have a triangular cross-section.

7. An impact decorticator according to claim 6, wherein the included angle of the ripples closest to the inlet and outlet is greater than 120°, the depth of said ripples is less than 5 mm, and wherein the included angle and depth of the uniform ripples in the central zone are, respectively, less than 80° and greater than 10 mm.

8. An impact decorticator according to claim 1, having an open squirrel-cage rotor with regularly spaced, longitudinally extending bars arranged around the axis of rotation of the rotor so that alternate bars lie upon a pitch circle which has a smaller radius than that of the pitch circle upon which the remainder of the bars are located.

9. An impact decorticator according to claim 8, wherein the difference in radii between the respective pitch circles is not greater than the radial dimension of the bars.

10. An impact decorticator according to claim 8 wherein said graded ripples are formed in an inlet zone of said internal surface adjacent to the inlet opening, and wherein a plurality of substantially uniform (i.e. ungraded) ripples are formed in a central zone of said internal surface adjacent to the inlet zone.

11. An impact decorticator according to claim 10, wherein the rotor/ripple clearance is between 3 millimeters and 10 millimeters at the central zone.

12. An impact decorticator according to claim 10, wherein graded ripples are formed in an outlet zone of said internal surface between said central zone and the outlet opening, the graded ripples of the inlet zone increase in sharpness, depth and closeness to the rotor as they progress toward the central zone, the uniform ripples of the central zone are the sharpest, deepest and closest to the rotor of all the ripples, and wherein the graded ripples of said outlet zone decrease progressively in depth and sharpness as they progress toward the outlet from the central zone.

13. An impact decorticator according to claim 12, wherein the arcuate length of the inlet zone and the arcuate length of the central zone are (respectively) between 15 and 30% and between 20 and 50% of the total arcuate length of the inlet, central and outlet zones.

14. An impact decorticator according to claim 12, wherein the included angle of the ripples closest to the inlet and outlet is greater than 120°, the depth of said ripples is less than 5 mm, and wherein the included angle and depth of the uniform ripples in the central zone are, respectively, less than 80° and greater than 10 mm.

15. An impact decorticator as in claim 1 wherein said ripples also approach the rotor more closely from the vicinity of the inlet opening toward a central zone between the inlet and outlet openings.

16. An impact decorticator as in claim 1 wherein said ripples also become progressively deeper from the vicinity of the inlet opening toward a central zone between the inlet and outlet openings.

17. An impact decorticator as in claim 1 wherein said ripples are also spaced progressively closer together from the inlet opening toward a central zone between the inlet and outlet openings.

18. An impact decorticator for separating components of plant material primarily by impact forces without any substantial shearing or grinding action comprising: a rotor mounted for rotation about a substantially horizontal axis in a casing which is provided at the upper portions thereof with an inlet opening and at the lower portion thereof with an outlet opening for the material being processed, said casing having a concave internal surface extending at least from the inlet opening to the outlet opening; and means forming horizontally extending ripples on the internal surface of said casing at a location extending from the inlet opening to a central zone which lies between the inlet opening and the outlet opening, said ripples having generally flat surfaces and the surfaces which face opposite the direction of rotation having angles of presentation which decrease from about 85° in the vicinity of the inlet opening to a minimum of about 50° in the central zone, the angle of presentation being the angle between a respective flat surface which faces opposite the direction of rotation and a radial line drawn from the axis of rotation of the rotor to the bottom of that surface.

19. A decorticator as in claim 18 wherein the ripples in the vicinity of the inlet opening are provided over an arc of not less than 25° and wherein the ripples in the central zone are provided over an arc of not less than 90°.

* * * * *

UNITED STATES PATENT AND TRADEMARK OFFICE
CERTIFICATE OF CORRECTION

PATENT NO. : 4,231,529

DATED : November 4, 1980

INVENTOR(S) : Norman James Peck, Thomas John Rowland and John Richard Ashes

It is certified that error appears in the above—identified patent and that said Letters Patent is hereby corrected as shown below:

On the front page format, after paragraph "[21]", insert:

--[30] Foreign Application Priority Data
   July 18, 1977    Australia......PD 0895/77--

Signed and Sealed this

Twenty-sixth Day of May 1981

[SEAL]

Attest:

RENE D. TEGTMEYER

Attesting Officer

Acting Commissioner of Patents and Trademarks